UNITED STATES PATENT OFFICE.

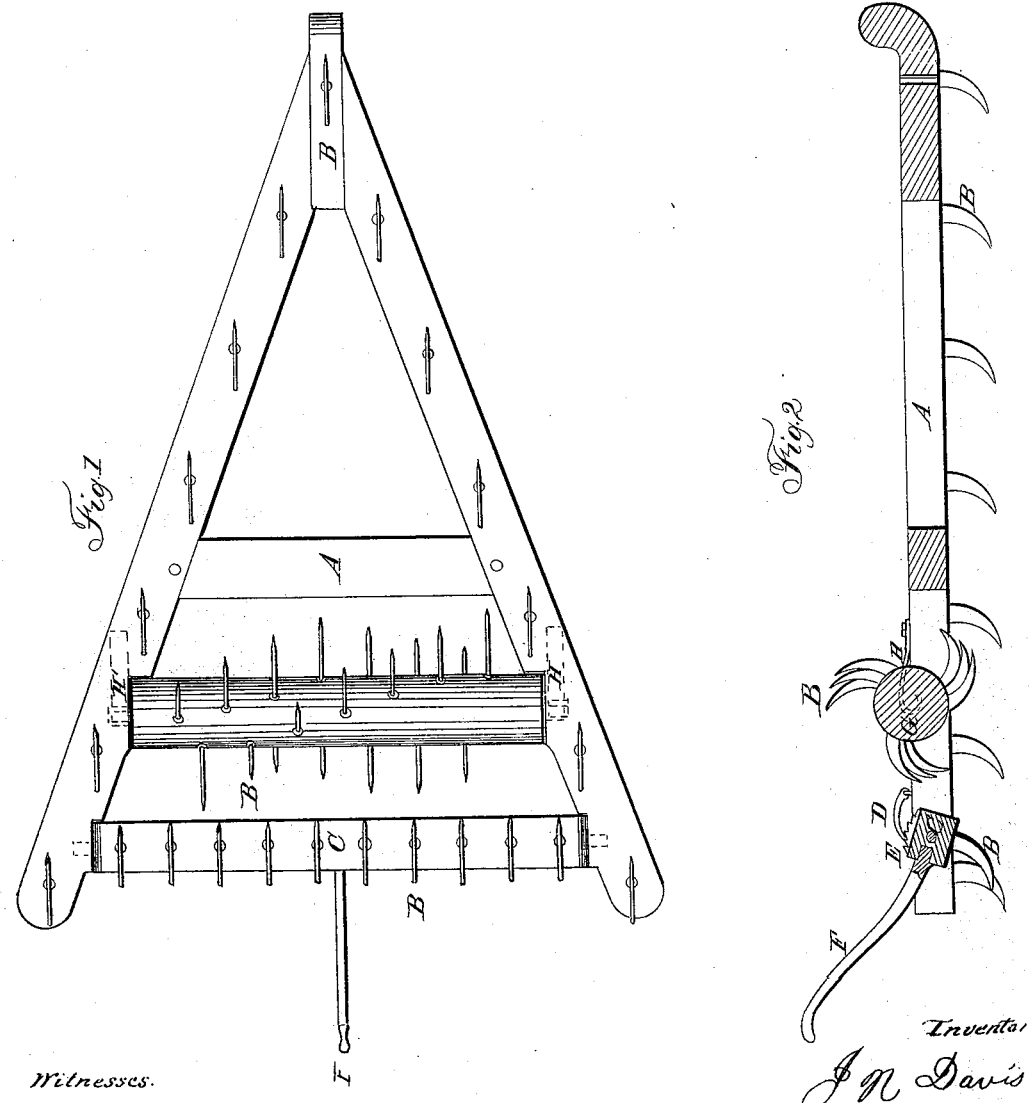

JOSHUA N. DAVIS, OF MARTINSVILLE, OHIO.

IMPLEMENT FOR DIVIDING CLODS IN THE FIELD.

Specification forming part of Letters Patent No. 44,404, dated September 27, 1864.

*To all whom it may concern:*

Be it known that I, JOSHUA N. DAVIS, of Martinsville, Clinton county, Ohio, have invented an Improved Implement for Dividing Clods in the Field; and I do hereby declare the following to be a full, clear, and exact description thereof, reference being had to the accompanying drawings, making part of this specification.

My invention relates to an improvement in the common harrow; and it consists chiefly in the provision of cimeter-formed knives or blades, which act to divide the surface clods to a certain uniform size, (about that of a goose-egg,) then either to pulverize them, as in rolling, or to merely bury or push them aside, as in ordinary cultivating and harrowing. A field whose surface is uniformly covered with small clods is found to be in better condition than one which has been leveled and pulverized with rolling, which is apt to become packed with the first heavy rain, and baked into a hard pan by a hot sun.

Figure 1 is a bottom view of my improved implement. Fig. 2 is a longitudinal section of the same.

A represents a triangular frame armed with cimeter-formed knives or blades B, whose advancing edges have the represented convex form, and are brought to a sharp cutting-edge. Athwart the rear of the frame is journaled a head or rail, C, armed with similar knives, B, and furnished with pawl and ratchet D E and a handle, F. For ground which is free of trash and stubble the head C is fixed in such a way as for its blades to have the same presentation as those on the main frame A. When so fixed they simply co-operate with those on the frame in dividing up whatever clods escape the latter; but should there be such an amount of corn-stubble or like trash as to seriously clog the rear teeth the ratchets may be liberated sufficiently to allow the said teeth to assume the position indicated in Fig. 2, so as to glide with their sharp edges over the trash, and thus cut it in pieces, instead of gathering and pushing it before them. Pins entering the head C from the frame may replace the pawl and ratchet.

In addition to the above there may be a rotary head, G, armed with similar knives to those above described, and journaled in the bearings H H' sufficiently rigid to sever all clods, but yet yielding enough to give way to stumps and rocks. The knives on the rotary head G are set spirally, as shown. The entire set of knives on the machine are placed at such relative lateral distance as collectively to score the ground in lines one and a half inch apart, so that no clod of greater thickness than that can escape being divided.

An implement built on this plan and tested in the field was found to leave the surface of the ground presenting the finely and uniformly granulated appearance desired by the best cultivators. It was also found to run a third lighter than a common drag-harrow, and to be free from swerving and jumping, although not receiving any hand guidance.

I claim herein as new and of my invention—

The arrangement of frame A, adjustable vibrating head C, and rotary head G, the whole being armed with cimeter-formed knives B, arranged and operating as set forth.

In testimony of which invention I hereunto set my hand.

JOSHUA N. DAVIS.

Witnesses:
GEO. H. KNIGHT,
WM. B. ANDREW.